United States Patent
Yamamoto et al.

(10) Patent No.: US 8,508,912 B2
(45) Date of Patent: Aug. 13, 2013

(54) CAPACITOR AND METHOD FOR MANUFACTURING THE SAME

(75) Inventors: Shigekatsu Yamamoto, Nagaokakyo (JP); Takao Hosokawa, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 201 days.

(21) Appl. No.: 13/029,206

(22) Filed: Feb. 17, 2011

(65) Prior Publication Data

US 2011/0205684 A1    Aug. 25, 2011

(30) Foreign Application Priority Data

Feb. 19, 2010    (JP) ................... 2010-034249
Jan. 26, 2011    (JP) ................... 2011-014226

(51) Int. Cl.
  *H01G 4/228*    (2006.01)

(52) U.S. Cl.
  USPC ............ 361/306.3; 361/306.1; 361/309; 361/310; 361/311; 361/312

(58) Field of Classification Search
  USPC ........ 361/306.1, 306.3, 312.2, 307, 309–313, 361/324
  See application file for complete search history.

(56) References Cited

U.S. PATENT DOCUMENTS

| | | | |
|---|---|---|---|
| 6,960,366 B2 | 11/2005 | Ritter et al. | |
| 6,972,942 B2 | 12/2005 | Ritter et al. | |
| 6,982,863 B2 | 1/2006 | Galvagni et al. | |
| 7,067,172 B2 | 6/2006 | Ritter et al. | |
| 7,152,291 B2 | 12/2006 | Ritter et al. | |
| 7,154,374 B2 | 12/2006 | Ritter et al. | |
| 7,161,794 B2 | 1/2007 | Galvagni et al. | |
| 7,177,137 B2 | 2/2007 | Ritter et al. | |
| 7,344,981 B2 | 3/2008 | Ritter et al. | |
| 7,345,868 B2 | 3/2008 | Trinh | |
| 7,463,474 B2 | 12/2008 | Ritter et al. | |
| 7,589,953 B2 * | 9/2009 | Togashi et al. | 361/306.3 |
| 8,149,565 B2 * | 4/2012 | Lee et al. | 361/301.1 |
| 2003/0011962 A1 | 1/2003 | Yamamoto | |
| 2005/0046536 A1 | 3/2005 | Ritter et al. | |
| 2007/0014075 A1 | 1/2007 | Ritter et al. | |

(Continued)

FOREIGN PATENT DOCUMENTS

| | | | |
|---|---|---|---|
| JP | 63-169014 A | | 7/1988 |
| JP | 404268710 | * | 9/1992 |

(Continued)

OTHER PUBLICATIONS

Official Communication issued in corresponding Korean Patent Application No. 10-2011-0011354, mailed on Feb. 8, 2012.

*Primary Examiner* — Jayprakash N Gandhi
*Assistant Examiner* — Hung Dang
(74) *Attorney, Agent, or Firm* — Keating & Bennett, LLP (57) ABSTRACT

A capacitor includes a capacitor body made of a dielectric, a first internal electrode, a second internal electrode, a first signal terminal, a second signal terminal, and a grounding terminal. The first and second signal terminals are connected to the first internal electrode. The grounding terminal is disposed on the outer surface of the capacitor body so as to be connected to the second internal electrode. The grounding terminal is connected to the ground potential. The grounding terminal includes a plating layer which is disposed on the capacitor body and which is connected to the second internal electrode.

12 Claims, 7 Drawing Sheets

(56) References Cited

U.S. PATENT DOCUMENTS

| | | |
|---|---|---|
| 2008/0081200 A1 | 4/2008 | Katsube et al. |
| 2008/0123248 A1 | 5/2008 | Kunishi et al. |
| 2008/0123249 A1 | 5/2008 | Kunishi et al. |
| 2008/0158774 A1 | 7/2008 | Trinh |
| 2009/0052114 A1 | 2/2009 | Motoki et al. |
| 2009/0268374 A1 | 10/2009 | Motoki et al. |

FOREIGN PATENT DOCUMENTS

| | | |
|---|---|---|
| JP | 10-154632 A | 6/1998 |
| JP | 2000-107658 A | 4/2000 |
| JP | 2005-086676 A | 3/2005 |
| JP | 2005-340371 A | 12/2005 |
| JP | 2006-339536 A | 12/2006 |
| JP | 2009-267146 A | 11/2009 |
| JP | 2009-295602 A | 12/2009 |

* cited by examiner

CAPACITOR AND METHOD FOR MANUFACTURING THE SAME

BACKGROUND OF THE INVENTION

1. Field of the Invention

The present invention relates to capacitors and methods for manufacturing capacitors. In particular, the present invention relates to a capacitor including a pair of signal terminals and a grounding terminal and a method for manufacturing the capacitor.

2. Description of the Related Art

The following capacitors are conventionally known: three-terminal capacitors disclosed in, for example, Japanese Unexamined Patent Application Publication No. 2000-107658 and other documents. A three-terminal capacitor typically includes a ceramic body having a substantially cuboid shape. The ceramic body includes first internal electrodes and second internal electrodes. The first internal electrodes and second internal electrodes are arranged in the ceramic body so as to face each other. One of the end surfaces of the ceramic body is overlaid with a first signal terminal and the other is overlaid with a second signal terminal. The first and second signal terminals are connected to the first internal electrodes. The second internal electrodes are connected to a grounding terminal which is disposed on a portion of a side surface of the ceramic body and which is connected to the ground potential.

Each of the first and second signal terminals and the grounding terminal includes a calcined layer disposed on the ceramic body and at least one plating layer disposed on the calcined layer.

The calcined layers of the first and second signal terminals are formed in such a manner that the ceramic body is mechanically positioned and a conductive paste is applied to the ceramic body and then calcined. It is extremely difficult to mechanically apply the conductive paste to the ceramic body with high positional accuracy. Therefore, the first and second signal terminals must be larger than exposed portions of the first and second internal electrodes such that the exposed portions of the first and second internal electrodes are securely covered with the first and second signal terminals. In other words, the exposed portions of the first and second internal electrodes must be smaller than the first and second signal terminals.

Since the first and second signal terminals include the calcined layers, the exposed portions of the first and second internal electrodes must be relatively small, as described above. Therefore, junctions between the second internal electrodes and the grounding terminal are likely to have a reduced electrode cross-sectional area. The reduction in electrode cross-sectional area of the junctions between the second internal electrodes and the grounding terminal causes an increase in ESL, resulting in the insertion loss characteristics being deteriorated.

SUMMARY OF THE INVENTION

To overcome the problems described above, preferred embodiments of the present invention provide a capacitor having good insertion loss characteristics and a method for manufacturing the capacitor.

A capacitor according to a preferred embodiment of the present invention preferably includes a capacitor body having a substantially cuboid shape, a first internal electrode, a second internal electrode, a first signal terminal, a second signal terminal, and a grounding terminal. The capacitor body is preferably made of a dielectric and has a first principal surface, a second principal surface, a first side surface, a second side surface, a first end surface, and a second end surface. The first and second principal surfaces extend in a length direction and a width direction. The first and second side surfaces extend in the length direction and a height direction. The first and second end surfaces extend in the width direction and the height direction. The first internal electrode is disposed in the capacitor body. The second internal electrode is disposed in the capacitor body and faces the first internal electrode. The first signal terminal is disposed on the first end surface and is connected to the first internal electrode. The second signal terminal is disposed on the second end surface and is connected to the first internal electrode. The grounding terminal is disposed on a portion of the first side surface so as to be connected to the second internal electrode and is connected to the ground potential. The grounding terminal preferably includes at least one plating layer. The at least one plating layer is preferably disposed on the capacitor body and is directly connected to the second internal electrode.

In the capacitor, the at least one plating layer may preferably be formed by wet plating, for example. This enables the capacitor body to be less damaged as compared to electroless plating the capacitor body using a chemical solvent.

The capacitor may preferably be a noise filter, for example.

In the capacitor, the first and second signal terminals may preferably be connected to a positive potential. In this case, the grounding terminal is at the ground potential. Therefore, even if moisture enters the capacitor body through a portion on which the grounding terminal is disposed, a metal component included in the grounding terminal is not ionized. Thus, the reliability of the capacitor is effectively prevented from being reduced by the ionization of the metal component included in the grounding terminal.

In the capacitor, the grounding terminal may preferably include no calcined conductive layer. This enables the positional accuracy to be significantly improved.

In the capacitor, each of the first and second signal terminals may preferably include at least one plating layer which is disposed on the outer surface of the capacitor body and which is directly connected to the first internal electrode and also may preferably include at least one calcined conductive layer which is disposed on the at least one plating layer and which includes a glass component. This configuration allows the reduction in reliability of the capacitor to be effectively prevented.

In the capacitor, each of the first and second signal terminals may preferably include a calcined conductive layer which is disposed on the outer surface of the capacitor body, which is directly connected to the first internal electrode, and which includes a glass component and also may include at least one plating layer which is disposed on the calcined conductive layer. With this configuration, the calcined conductive layer includes the glass component. Thus, moisture is effectively prevented from entering the capacitor body through portions of the capacitor body on which the first and second signal terminals are disposed. The calcined conductive layer has increased adhesion to the capacitor body. Thus, the reliability of the capacitor is effectively prevented from being reduced by the ionization of a metal component included in the first and second signal terminals.

In the capacitor, the calcined conductive layer may preferably include Cu, for example.

The capacitor may preferably further include a dummy grounding electrode connected to the grounding terminal. In the capacitor, the grounding terminal may preferably include a portion disposed on the first principal surface and a portion disposed on the second principal surface, the second internal electrode may preferably include a facing portion facing the first internal electrode in the height direction and a connecting portion connecting the facing portion to the grounding terminal, and the dummy grounding electrode may preferably be disposed between the connecting portion of the second internal electrode and the portion of the first grounding terminal that is disposed on the first or second principal surface in the height direction. With this configuration, all solder-wetted areas can be formed together over a region from the first principal surface to the second principal surface through a side surface by plating when the capacitor is soldered to a board.

In the capacitor, the at least one plating layer connected to the second internal electrode may preferably include a Cu plating sub-layer including Cu, for example. With this configuration, the at least one plating layer can be easily formed on the capacitor body.

In the capacitor, the grounding terminal may preferably further include a Ni plating layer which is disposed on the Cu plating sub-layer and which includes Ni and a Sn plating layer which is disposed on the Ni plating layer and which includes Sn, for example. This improves the adhesion between the grounding terminal and the solder.

In the capacitor, the first and second internal electrodes may preferably be made of Ni, for example. This enables the capacitor to be manufactured at reduced cost as compared to the case of using, for example, Pd or Ag—Pd to form the first and second internal electrodes.

Another preferred embodiment of the present invention provides a method for manufacturing the capacitor. The method preferably includes a step of preparing a first sheet including a conductive film for forming the first internal electrode by applying a conductive paste for forming the first internal electrode to a dielectric sheet by printing; a step of preparing a second sheet including a conductive film for forming the second internal electrode by applying a conductive paste for forming the second internal electrode to a dielectric sheet by printing; a step of forming a laminate by stacking the first sheet, the second sheet, and dielectric sheets which do not include conductive paste; a step of calcining the laminate; a step of applying a conductive paste to the laminate such that the conductive paste touches the conductive film for forming the first internal electrode; a step of baking the conductive paste applied to the laminate into the calcined conductive layer; a step of forming the at least one plating layer on the laminate such that the at least one plating layer is in contact with the conductive film for the second internal electrode; and a step of alloying the at least one plating layer and the conductive film for the second internal electrode at the interfaces between the at least one plating layer and the conductive film for forming the second internal electrode by heating the laminate. In the method, the alloying step enables the at least one plating layer and the conductive film for forming the second internal electrode to be alloyed at the interfaces between the at least one plating layer and the conductive film for forming the second internal electrode. Therefore, the at least one plating layer and the second internal electrode are bonded to each other with high strength. Thus, the capacitor can be manufactured so as to have high reliability.

In the method, the conductive paste-applying step, the baking step, the plating layer-forming step, and the alloying step may preferably be performed in that order.

In the method, preferably, the plating layer-forming step may be performed prior to the baking step, the conductive paste-applying step may be performed subsequently to the plating layer-forming step, and the baking step and the alloying step may be performed together subsequently to the conductive paste-applying step. This simplifies the steps of manufacturing the capacitor. Therefore, the capacitor can be easily manufactured at a reduced cost.

In the method, the plating layer-forming step, the alloying step, the conductive paste-applying step, and the baking step may preferably be performed in that order.

According to various preferred embodiment of the present invention, a portion of a grounding terminal that is connected to a second internal electrode preferably includes a plating layer. Unlike calcined layers formed by applying conductive pastes to exposed portions of internal electrodes, the plating layer is formed by growing plated portions from an exposed portion of an internal electrode. This enables the plating layer to be formed with high positional accuracy. Therefore, the uneven application of a conductive paste need not be taken into account or a portion of the internal electrode that is exposed from a capacitor body need not be small in consideration of unevenness. That is, the portion of the internal electrode that is exposed from the capacitor body may be relatively large. This enables a junction between the second internal electrode and the grounding terminal to have an increased electrode cross-sectional area and enables ESL to be reduced. Therefore, good insertion loss characteristics are achieved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will now be described with reference to the drawings.

Figure 1:
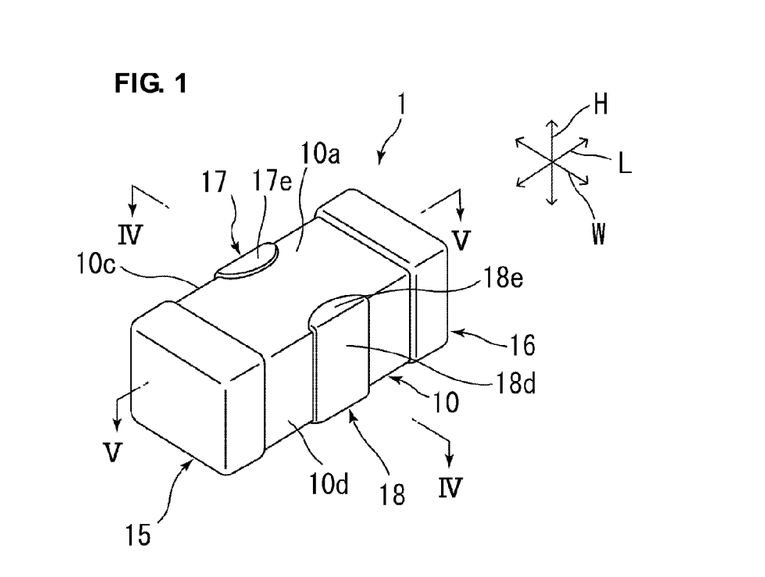
FIG. 1 is a schematic perspective view of a capacitor according to a preferred embodiment of the present invention.
Figure 2:
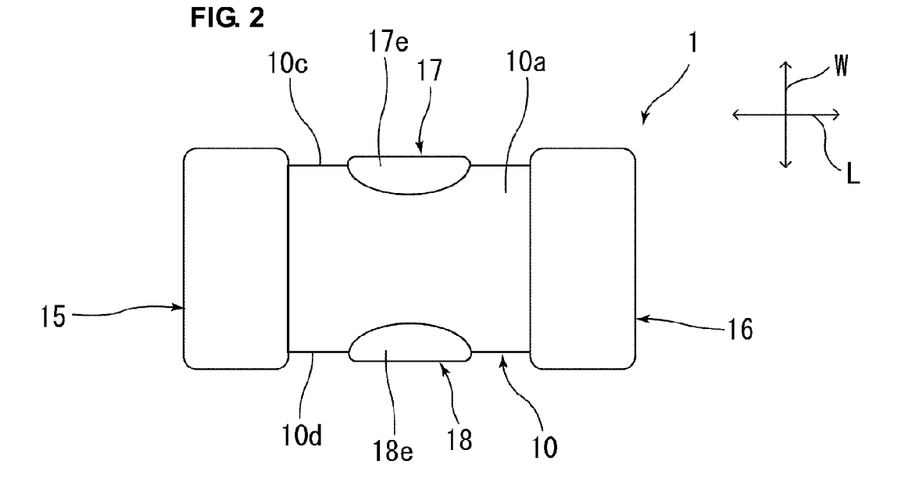
FIG. 2 is a schematic plan view of the capacitor shown in FIG. 1.
Figure 3:
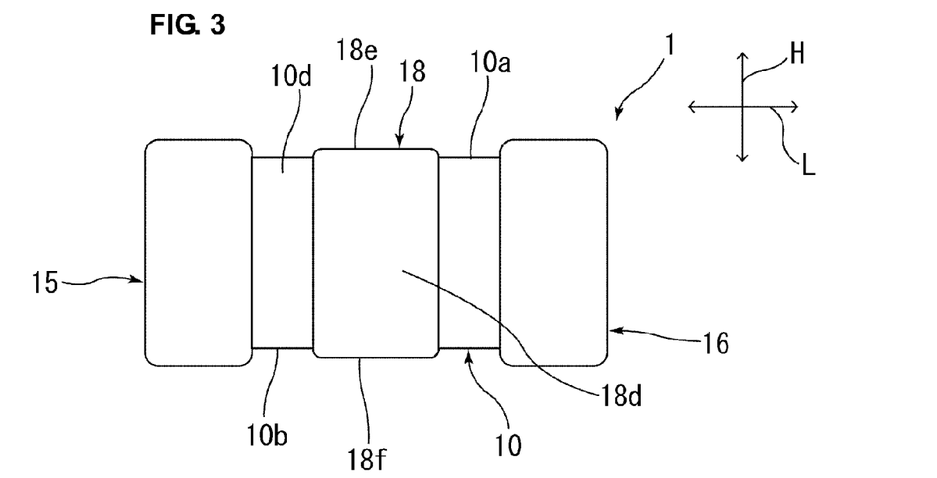
FIG. 3 is a schematic side view of the capacitor shown in FIG. 1.

FIG. 1 is a schematic perspective view of a capacitor 1 according to a preferred embodiment of the present invention. FIG. 2 is a schematic plan view of the capacitor 1. FIG. 3 is a schematic side view of the capacitor 1.

The capacitor 1 is preferably used as a noise filter, for example. With reference to FIGS. 1 to 3, the capacitor 1 includes a capacitor body (ceramic body) 10. The capacitor body 10 is preferably made of a dielectric. In particular, the capacitor body 10 is preferably made of, for example, a ceramic dielectric. Examples of the ceramic dielectric include $BaTiO_3$, $CaTiO_3$, $SrTiO_3$, and $CaZrO_3$. The capacitor body 10 may preferably be appropriately doped with, for example, a complementary component such as an Mn compound, an Fe compound, a Cr compound, a Co compound, or a Ni compound.

In this preferred embodiment, the capacitor body 10 preferably has a substantially cuboid shape, for example. The capacitor body 10 includes a first principal surface 10a, a second principal surface 10b, a first side surface 10c, a second side surface 10d, a first end surface 10e, and a second end surface 10f. The first and second principal surfaces 10a and 10b extend in a length direction L and a width direction W. The first and second side surfaces 10c and 10d extend in the length direction L and a height direction H. The first and second end surfaces 10e and 10f extend in the width direction W and the height direction H.

The capacitor body 10 includes a plurality of first internal electrodes 11 and a plurality of second internal electrodes 12. The first and second internal electrodes 11 and 12 are alternately arranged in the height direction H so as to face each other with dielectric layers disposed therebetween.

Figure 5:
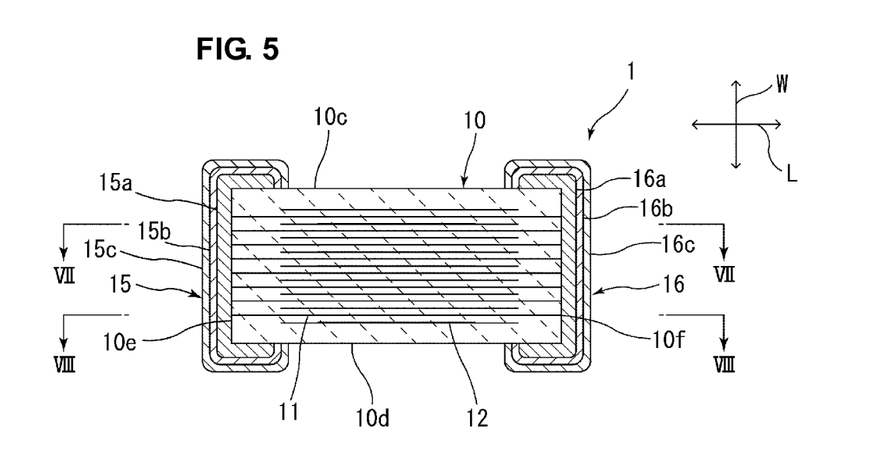
FIG. 5 is a schematic sectional view of the capacitor taken along the line V-V of FIG. 1.
Figure 8:
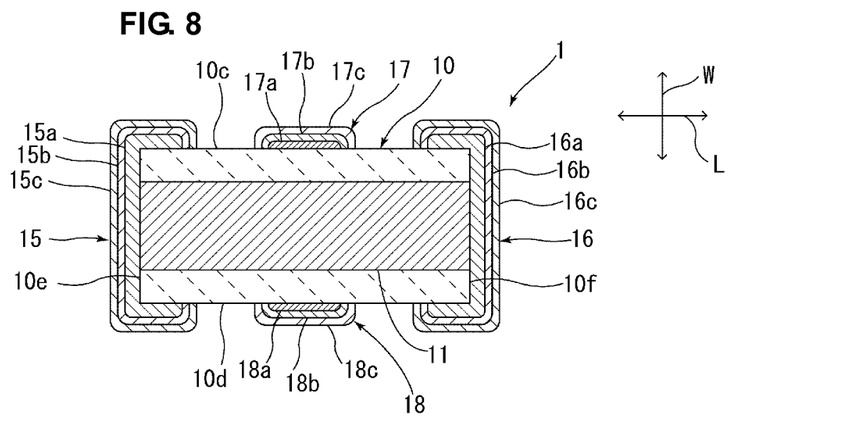
FIG. 8 is a schematic sectional view of the capacitor taken along the line VIII-VIII of FIG. 5.

With reference to FIGS. 5 and 8, the first internal electrodes 11 extend in the length direction L and the width direction W. The first internal electrodes 11 are preferably exposed at the first and second end surfaces 10e and 10f. The first internal electrodes 11 are preferably not exposed at the first and second side surfaces 10c and 10d.

Figure 4:
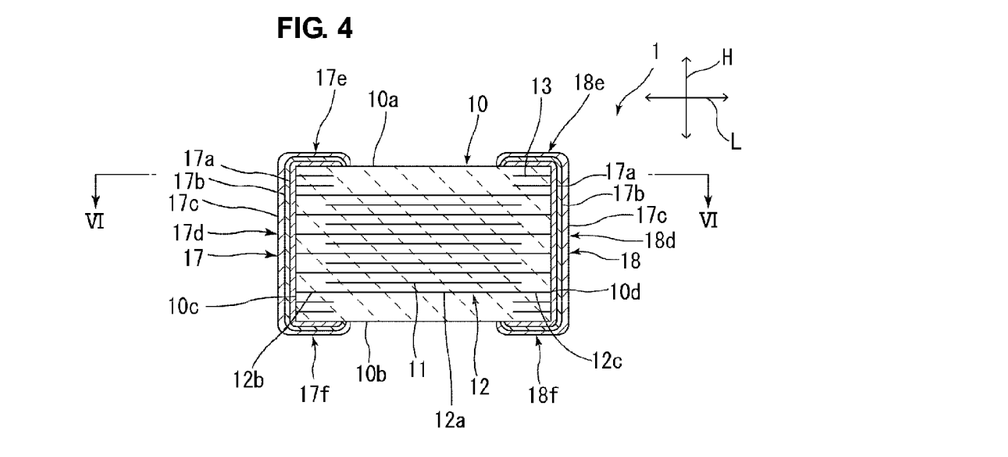
FIG. 4 is a schematic sectional view of the capacitor taken along the line IV-IV of FIG. 1.
Figure 7:
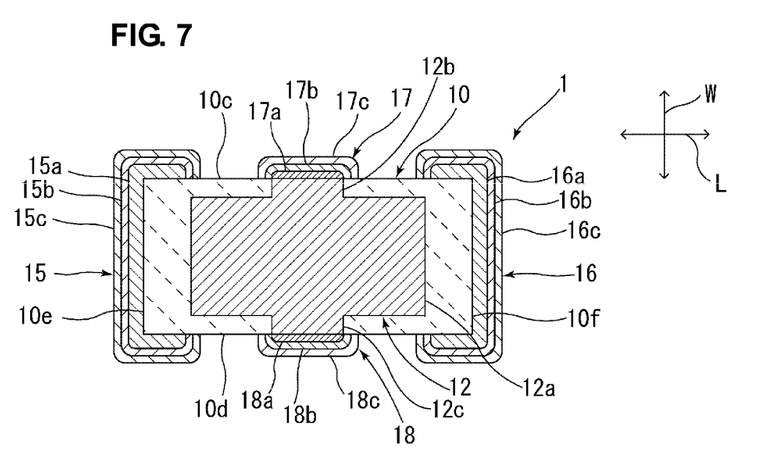
FIG. 7 is a schematic sectional view of the capacitor taken along the line VII-VII of FIG. 5.

With reference to FIGS. 4 and 7, the second internal electrodes 12 extend in the length direction L and the width direction W. The second internal electrodes 12 preferably include facing portions 12a arranged to face the first internal electrodes 11 in the height direction H, first connecting portions 12b connected to the facing portions 12a, and second connecting portions 12c connected to the facing portions 12a as shown in FIGS. 4 and 7.

The facing portions 12a are arranged in an approximate center region of the capacitor body 10 when viewed in the height direction H. The facing portions 12a are not exposed at any of the first and second side surfaces 10c and 10d and the first and second end surfaces 10e and 10f.

One end of each first connecting portion 12b is connected to a corresponding one of the facing portions 12a and the other end is exposed at the first side surface 10c. One end of each second connecting portion 12c is connected to a corresponding one of the facing portions 12a and the other end is exposed at the second side surface 10d. The first and second connecting portions 12b and 12c are preferably longer than the facing portions 12a when viewed in the length direction L.

A material for forming the first and second internal electrodes 11 and 12 is not particularly limited. The first and second internal electrodes 11 and 12 preferably include, for example, Ni and are preferably substantially made of Ni.

With reference to FIGS. 1 to 3 and 6 to 8, the first end surface 10e of the capacitor body 10 preferably includes a first signal terminal 15 disposed thereon. The first signal terminal 15 preferably extends over the first end surface 10e to the first and second principal surfaces 10a and 10b and the first and second side surfaces 10c and 10d. The first signal terminal 15 is connected to the first internal electrodes 11 as shown in FIG. 8.

With reference to FIGS. 1 to 3 and 6 to 8, the second end surface 10f of the capacitor body 10 preferably includes a second signal terminal 16 disposed thereon. The second signal terminal 16 preferably extends over the second end surface 10f to the first and second principal surfaces 10a and 10b and the first and second side surfaces 10c and 10d. The second signal terminal 16 is connected to the first internal electrodes 11 as shown in FIG. 8.

The polarity of a potential connected to the first and second signal terminals 15 and 16 is not particularly limited. In this preferred embodiment, the first and second signal terminals 15 and 16 are connected to a positive potential as described below.

Figure 6:
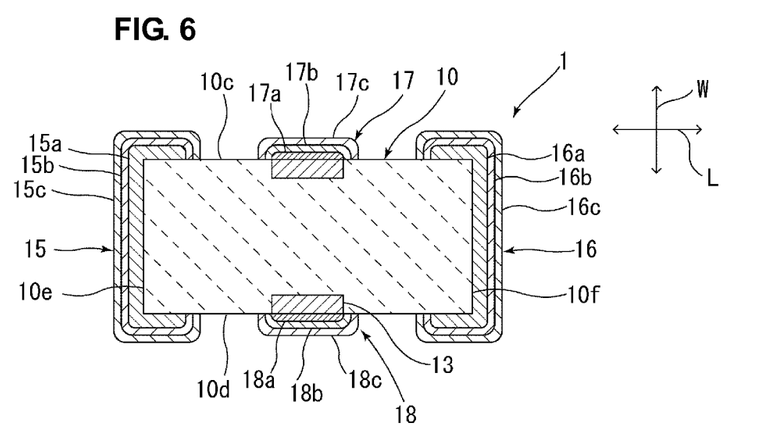
FIG. 6 is a schematic sectional view of the capacitor taken along the line VI-VI of FIG. 4.

In this preferred embodiment, each of the first and second signal terminals 15 and 16 is preferably defined by a laminate including three conductive layers, for example. In particular, the first signal terminal 15 preferably has a multilayer structure including a calcined conductive layer 15a, a first plating layer 15b, and a second plating layer 15c and the second signal terminal 16 has a multilayer structure including a calcined conductive layer 16a, a first plating layer 16b, and a second plating layer 16c as shown in FIGS. 6 to 8.

The calcined conductive layers 15a and 16a are preferably formed by calcining a conductive paste including a conductive agent and a glass component. Therefore, moisture is effectively prevented from entering the capacitor body 10 through portions of the capacitor body 10 on which the first and second signal terminals 15 and 16 are disposed. Thus, the reliability of the capacitor 1 is effectively prevented from being reduced by the ionization of a metal included in the first and second signal terminals 15 and 16.

The thicknesses of the calcined conductive layers 15a and 16a are not particularly limited and may preferably have a thickness of, for example, about 10 μm to about 60 μm.

The conductive agent, which is included in the calcined conductive layers 15a and 16a, is preferably, for example, Cu. This is because Cu has an increased affinity to the first and second internal electrodes 11 and 12, which includes Ni, for example. When the first internal electrode 11 includes Ni and the calcined conductive layers 15a and 16a includes Cu, Cu and Ni are alloyed at the interfaces between the calcined conductive layers 15a and 16a and the first internal electrodes 11 during the calcination of the calcined conductive layers 15a and 16a and therefore the calcined conductive layers 15a and 16a can be tightly bonded to the first internal electrodes 11.

The first plating layers 15b and 16b are preferably disposed on the calcined conductive layers 15a and 16a, respectively. A material for forming the first plating layers 15b and 16b is not particularly limited. The first plating layers 15b and 16b may preferably be formed by, for example, Ni plating. This enables the first plating layers 15b and 16b to have improved solderability.

The second plating layers 15c and 16c are disposed on the first plating layers 15b and 16b, respectively. A material for forming the second plating layers 15c and 16c is not particularly limited. The second plating layers 15c and 16c may preferably be formed by, for example, Sn plating. This enables the second plating layers 15c and 16c to have improved solderability.

The thicknesses of the first plating layers 15b and 16b and the second plating layers 15c and 16c are not particularly limited and may preferably have a thickness of, for example, about 1 μm to about 5 μm.

With reference to FIGS. 1 to 3 and 6 to 8, a first grounding terminal 17 and a second grounding terminal 18 are preferably arranged on an outer surface of the capacitor body 10 so as to be connected to the second internal electrodes 12. The first and second grounding terminals 17 and 18 are connected to the ground potential.

With reference to FIGS. 1, 2, and 4, the first grounding terminal 17 is preferably disposed on an approximate center portion of the first side surface 10c in the length direction L. The first grounding terminal 17 preferably includes an upper end portion extending to the first principal surface 10a. The first grounding terminal 17 preferably includes a lower end portion extending to the second principal surface 10b. That is, the first grounding terminal 17 preferably includes a first portion 17d disposed on the approximate center portion of the first side surface 10c in the length direction L, a second portion 17e disposed on the first principal surface 10a, and a third portion 17f disposed on the second principal surface 10b. The first portion 17d is connected to the first connecting portions 12b of the second internal electrodes 12 as shown in FIGS. 4 and 7.

With reference to FIGS. 1, 2, and 4, the second grounding terminal 18 is preferably disposed on an approximate center portion of the second side surface 10d in the length direction L. The second grounding terminal 18 preferably includes an upper end portion extending to the first principal surface 10a. The second grounding terminal 18 preferably includes a lower end portion extending to the second principal surface 10b. That is, the second grounding terminal 18 preferably includes a first portion 18d disposed on substantially the center portion of the second side surface 10d in the length direction L, a second portion 18e disposed on the first principal surface 10a, and a third portion 18f disposed on the second principal surface 10b. The first portion 18d is connected to the second connecting portions 12c of the second internal electrodes 12 as shown in FIGS. 4 and 7.

Figure 13:
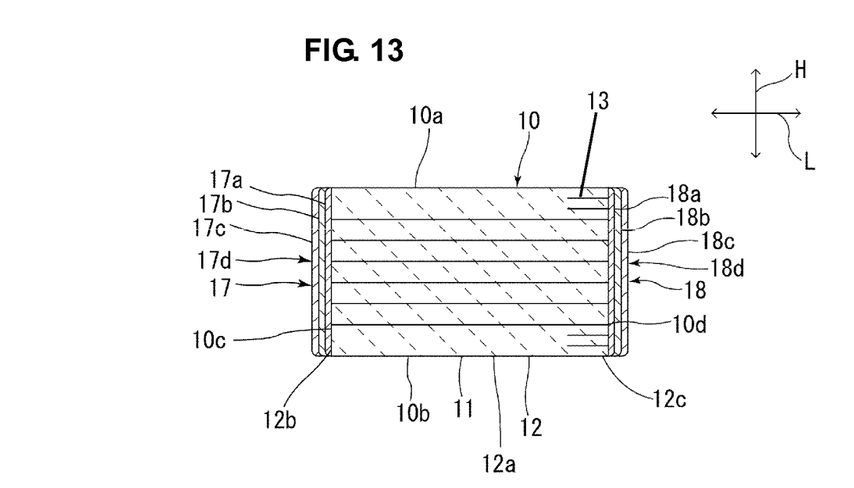
FIG. 13 is a schematic sectional view of a capacitor according to a third modification of a preferred embodiment of the present invention.

In this preferred embodiment, in order to form the first and second grounding terminals 17 and 18 such that the first and second grounding terminals 17 and 18 extend to the first and second principal surfaces 10a and 10b, seed layers used for electrification in a plating step need to be formed prior to the formation of the first and second grounding terminals 17 and 18. However, preferred embodiments of the present invention are not limited to such a procedure. The first and second grounding terminals 17 and 18 may be formed without forming the seed layers in advance. In this case, the first and second grounding terminals 17 and 18 are formed only on the first or second side surface 10c or 10d and are not formed on the first or second principal surface 10a or 10b as shown in FIG. 13. That is, the first and second grounding terminals 17 and 18 include only the first portions 17d and 18d, respectively.

With reference to FIG. 4, dummy grounding electrodes 13 are preferably arranged between the first and second connecting portions 12b and 12c of the second internal electrodes 12 and the second and third portions 17e, 18e, 17f, and 18f of the first and second grounding terminals 17 and 18 in the height direction H. Each of the dummy grounding electrodes 13 are preferably connected to the first portion 17d or 18d of the first or second grounding terminal 17 or 18 as shown in FIGS. 4 and 6. The presence of the dummy grounding electrodes 13 enable all solder-wetted areas soldered to a board to be formed together by plating.

In this preferred embodiment, the first grounding terminal 17 preferably has a multilayer structure including a first plating layer 17a, a second plating layer 17b, and a third plating layer 17c and the second grounding terminal 18 preferably has a multilayer structure including a first plating layer 18a, a second plating layer 18b, and a third plating layer 18c as shown in FIGS. 4 and 6 to 8. The first plating layers 17a and 18a are disposed on the capacitor body 10. In particular, the first plating layer 17a is disposed on the first side surface 10c. The first plating layer 17a is connected to the first connecting portions 12b of the second internal electrodes 12. The first plating layer 18a is disposed on the second side surface 10d. The first plating layer 18a is connected to the second connecting portions 12c of the second internal electrodes 12. The second plating layers 17b and 18b are disposed on the first plating layers 17a and 18a, respectively. The third plating layers 17c and 18c are disposed on the second plating layers 17b and 18b, respectively.

The first plating layers 17a and 18a, the second plating layers 17b and 18b, and the third plating layers 17c and 18c are not particularly limited except that the first plating layers 17a and 18a, the second plating layers 17b and 18b, and the third plating layers 17c and 18c are formed by plating. The first plating layers 17a and 18a, the second plating layers 17b and 18b, and the third plating layers 17c and 18c are preferably formed by wet plating. In this case, no chemical solvent is used and, therefore, damage to the capacitor body 10 can be minimized. Furthermore, a step of applying a solvent to specific regions is not necessary and therefore manufacturing costs are reduced.

Materials for forming the first plating layers 17a and 18a, the second plating layers 17b and 18b, and the third plating layers 17c and 18c are not particularly limited. The first plating layers 17a and 18a preferably include, for example, Cu. When the first plating layers 17a and 18a include Cu and the second internal electrodes 12 include Ni, Cu and Ni are alloyed by heat treatment at the interfaces between the first plating layers 17a and 18a and the second internal electrodes 12. This enables the first plating layers 17a and 18a to be tightly bonded to the second internal electrodes 12.

The second plating layers 17b and 18b preferably include, for example, Ni. This enables the second plating layers 17b and 18b to have improved solderability. The third plating layers 17c and 18c preferably include, for example, Sn. This enables the third plating layers 17c and 18c to have improved solderability.

The thicknesses of the first plating layers 17a and 18a, the second plating layers 17b and 18b, and the third plating layers 17c and 18c are not particularly limited. The first plating layers 17a and 18a may preferably have a thickness of, for example, about 2 µm to about 10 µm. The second plating layers 17b and 18b may preferably have a thickness of, for example, about 1 µm to about 5 µm. The third plating layers 17c and 18c may preferably have a thickness of, for example, about 1 µm to about 5 µm.

Figure 9:
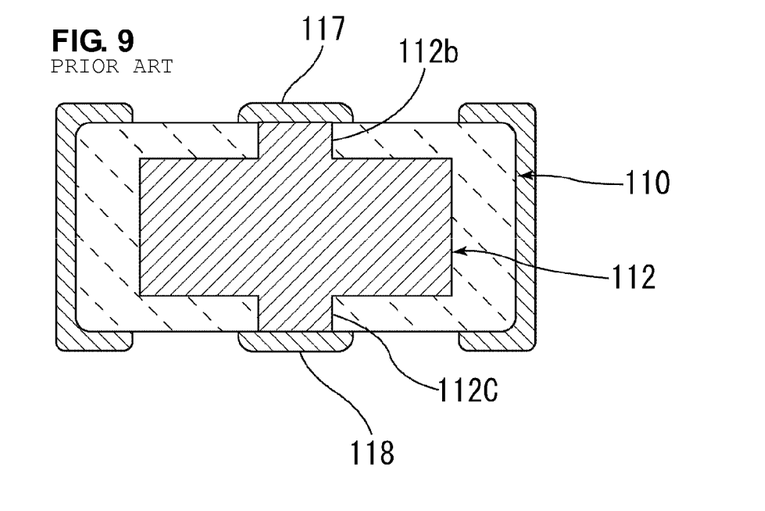
FIG. 9 is a schematic sectional view of a conventional capacitor for reference.

When forming grounding terminals 117 and 118 from calcined films as shown in FIG. 9, the length of each of connecting portions 112b and 112c of second internal electrodes 112 must be less than the length of each of the grounding terminals 117 and 118 in the length direction L. The connecting portions 112b and 112c must be securely covered with the grounding terminals 117 and 118. This is because it is difficult to apply a conductive paste to desired areas with high positional accuracy. Furthermore, it is difficult to form the calcined films such that the calcined films have a small thickness. Therefore, the grounding terminals 117 and 118 have a relatively large thickness. Thus, a capacitor body 110 must have a reduced size depending on the thickness of the grounding terminals 117 and 118. Therefore, the connecting portions 112b and 112c also must have a reduced thickness. This causes problems such as increased ESL and increased noise.

Figure 10:
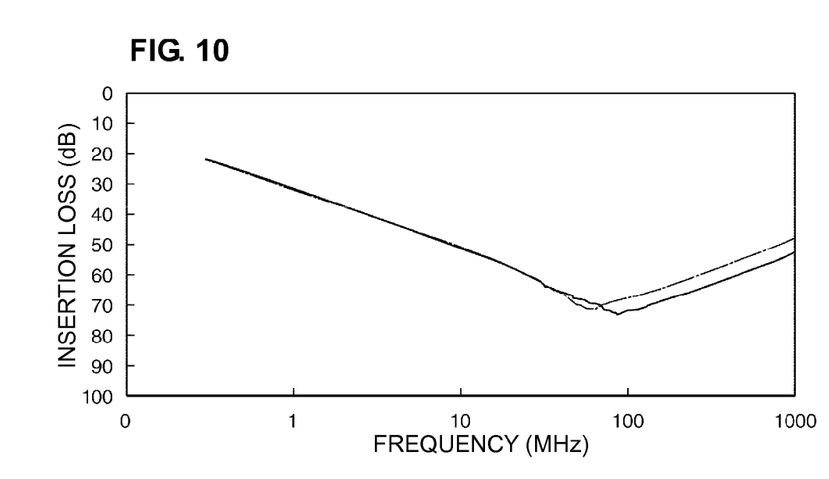
FIG. 10 is a graph showing the insertion losses of capacitors.
Figure 11:
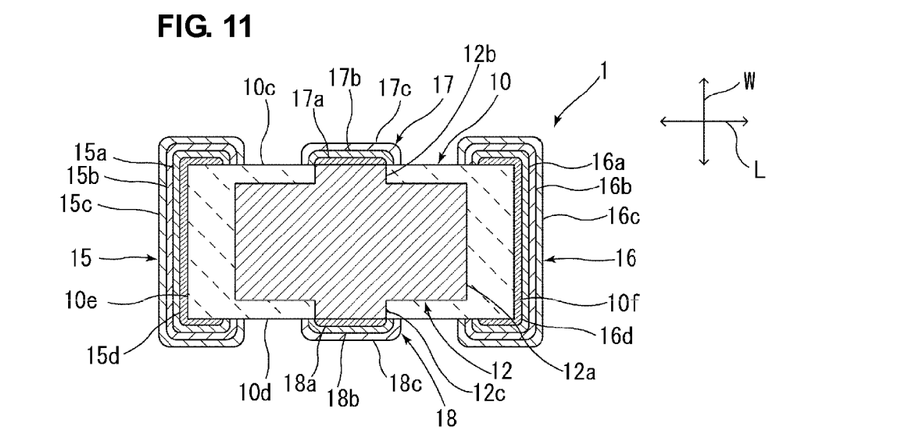
FIG. 11 is a schematic sectional view of a capacitor according to a first modification of a preferred embodiment of the present invention.

In contrast, the first plating layers 17a and 18a are preferably disposed on the first and second connecting portions 12b and 12c, respectively, in this preferred embodiment. Ordinary plating layers can be formed with high positional accuracy. Therefore, the length of the first and second connecting portions 12b and 12c need not be less than that of the first plating layers 17a and 18a, respectively. This enables the first and second connecting portions 12b and 12c to have an increased electrode cross-sectional area. Therefore, for example, reduced ESL and reduced noise is achieved as shown in FIG. 10. With reference to FIG. 10, a solid line shows data obtained from a three-terminal capacitor which has a length of about 1.0 mm and a width of about 0.5 mm and which includes a grounding terminal having a length of about 0.3 mm and second internal electrodes including connecting portions having a length of about 0.3 mm in the length direction L, the innermost layer of each second internal electrode being a plating layer. A dashed-dotted line in FIG. 10 shows data obtained from a three-terminal capacitor which has a length of about 1.0 mm and a width of about 0.5 mm and which includes a grounding terminal having a length of about 0.3 mm and second internal electrodes including connecting portions having a length of about 0.15 mm in the length direction L, the innermost layer of each second internal electrode being a calcined layer. The data shown in FIG. 10 illustrates that insertion loss can be improved by 10 dB or more by changing the innermost layer of each second internal electrode from the calcined layer to the plating layer.

When the grounding terminals 117 and 118 are calcined coatings including a glass component as shown in FIG. 9, moisture is effectively prevented from entering the capacitor body 110 through portions of a capacitor body 110 on which the grounding terminals 117 and 118 are disposed.

When forming plating layers 15a and 16a on the capacitor body 110 in substantially the same manner as that described in this preferred embodiment, moisture is likely to enter the capacitor body 110 through portions of the capacitor body 110 on which the plating layers 15a and 16a are disposed. However, in this preferred embodiment, the first and second signal terminals 15 and 16 are connected to a positive potential. Thus, the grounding terminals 17 and 18 are at the ground potential. Therefore, even if moisture is present, a metal component included in the grounding terminals 17 and 18 is not ionized. Thus, the reliability of the capacitor 1 is effectively prevented from being reduced by the ionization of the metal component contained in the grounding terminals 17 and 18.

A method for manufacturing the capacitor 1 according to a preferred embodiment of the present invention will now be described.

For example, a first internal electrode-forming conductive paste, such as a Ni paste, is preferably applied to dielectric sheets by printing, whereby first sheets including first internal electrode-forming conductive films are obtained. For example, a second internal electrode-forming conductive paste, such as a Ni paste, is applied to dielectric sheets by printing, whereby second sheets including second internal electrode-forming conductive films are obtained. Third sheets including dummy grounding electrode-forming conductive films are obtained by a similar procedure. The first to third sheets and dielectric sheets having no conductive paste are stacked, whereby a laminate is formed. The laminate is calcined (a calcining step), whereby the capacitor body 10 is prepared. A conductive paste for forming the calcined conductive layers 15a and 16a of the first and second signal terminals 15 and 16 is applied to the first and second end surfaces 10e and 10f of the capacitor body 10, which is a calcined body, (a conductive paste-applying step) and is then baked (a baking step), whereby the calcined conductive layers 15a and 16a are formed. Co-firing may preferably be performed such that the baking step and the calcining step are performed together.

The first plating layers 17a and 18a are preferably formed on the capacitor body 10 such that the calcined conductive layers 15a and 16a are covered with masks. After the masks are removed, the first plating layers 15b and 16b, the second plating layers 15c and 16c, the second plating layers 17b and 18b, and the third plating layers 17c and 18c are preferably formed on the capacitor body 10 in that order (a plating layer-forming step), whereby the capacitor 1 is completed. After these plating layers are formed, the capacitor body 10 is preferably heated (an alloying step). In the alloying step, the capacitor body 10 is heated subsequently to the formation of the first plating layers 17a and 18a such that alloying occurs at the interfaces between the first plating layers 17a and 18a and the second internal electrodes 12, whereby the bonding strength between the first plating layers 17a and 18a and the second internal electrodes 12 is increased. Alternatively, the capacitor body 10 may preferably be heated subsequently to the formation of the first plating layers 15b and 16b for the purpose of performing the baking step and the alloying step together. This enables the calcined conductive layers 15a and 16a to be alloyed with the first plating layers 15b and 16b and also enables the first plating layers 17a and 18a to be alloyed with the second internal electrodes 12. Thus, the bonding strength between the first plating layers 17a and 18a and the second internal electrodes 12 and the bonding strength between the calcined conductive layers 15a and 16a and the first plating layers 15b and 16b can be effectively increased. The method for manufacturing the capacitor 1 is simplified by performing the baking step and the alloying step together as described above.

In the method described above, the baking step, the plating layer-forming step, and the alloying step are preferably performed in that order as described above. However, preferred embodiments of the present invention are not limited to this order. After the plating layer-forming step is performed prior to the baking step, the baking step and the alloying step may be performed together. In particular, the first and second signal terminals 15 and 16 and the first and second grounding terminals 17 and 18 may be formed by a procedure below.

Before the calcined conductive layers 15a and 16a are formed, the capacitor body 10 is preferably plated, whereby the first plating layer 17a and the first plating layer 18a are formed on the first side surface 10c and the second side surface 10d, respectively, and a third plating layer 15d for forming the first signal terminal 15 and a third plating layer 16d for forming the second signal terminal 16 are preferably formed on the first end surface 10e and the second end surface 10f, respectively.

A conductive paste is preferably applied to the third plating layers 15d and 16d and is then baked, whereby the calcined conductive layers 15a and 16a, which include the glass component, are formed. In this case, heating performed in the baking step causes the third plating layers 15d and 16d to be alloyed with the first plating layers 17a and 18a. That is, the baking step and the alloying step are performed together. After the third plating layers 15d and 16d are alloyed with the first plating layers 17a and 18a by heating, the calcined conductive layers 15a and 16a may be formed.

After the calcined conductive layers 15a and 16a are formed, the first plating layers 15b and 16b, the second plating layers 15c and 16c, the second plating layers 17b and 18b, and the third plating layers 17c and 18c are preferably formed in that order in substantially the same manner as that described in the preferred embodiment described above (a plating layer-forming step), whereby the capacitor 1 is completed.

In this modification, the baking step and the alloying step are performed together. This allows the method for manufacturing the capacitor 1 to be simplified. Thus, the capacitor 1 can be easily manufactured.

In the baking step, in which the conductive paste is baked into the calcined conductive layers 15a and 16a, gases are generated from an organic solvent included in the conductive paste. For example, where a layer of the conductive paste is formed, a plating layer is formed on the conductive paste layer, and baking the conductive paste layer and alloying the conductive paste layer with the plating layer are performed together, gases generated from the conductive paste layer are blocked by the plating layer and, therefore, the conductive paste layer is unlikely to be degassed. If the conductive paste layer is not sufficiently degassed, then bubbles remain in a calcined conductive layer prepared from the conductive paste layer. The presence of the bubbles in the calcined conductive layer may cause solder to be splashed because the bubbles burst when a capacitor is soldered. However, since the calcined conductive layers 15a and 16a are preferably formed subsequently to the formation of the above plating layers, the calcined conductive layers 15a and 16a are readily degassed and, therefore, bubbles are unlikely to remain. Thus, solder can be prevented from being splashed during soldering.

Since the first signal terminal 15 preferably has the multilayer structure including the calcined conductive layer 15a and the first and second plating layers 15b and 15c and the second signal terminal 16 preferably has the multilayer structure including the calcined conductive layer 16a and the first and second plating layers 16b and 16c as described above, the following effect can be achieved unlike a multilayer structure including only plating layers only: the effect of preventing the reliability of the capacitor 1 soldered to a board from being reduced by the ingress of moisture contained in an atmosphere surrounding a chip. A major cause of the reduction in reliability of the capacitor 1 by the ingress of moisture is probably that a metal component included in the first and second signal terminals 15 and 16, which are connected to a positive potential, is ionized by moisture.

In the preferred embodiment or the modification described above, the first grounding terminal 17 preferably has the multilayer structure including the first to third plating layers 17a to 17c and the second grounding terminal 18 preferably has the multilayer structure including the first to third plating layers 18a to 18c. That is, the first and second grounding terminals 17 and 18 include no calcined conductive layer and, instead, include only the plating layers.

For example, a grounding terminal may include a calcined conductive layer. When the grounding terminal includes the calcined conductive layer, a conductive paste must be accurately applied to a portion of a side surface. However, it is difficult to apply such a conductive paste to the side surface portion with high positional accuracy because mechanical positioning is required. This causes a reduction in positional accuracy of the grounding terminal.

Since the first grounding terminal 17 preferably only includes the first to third plating layers 17a to 17c and the second grounding terminal 18 preferably only includes the first to third plating layers 18a to 18c, mechanical positioning is not required. Therefore, the first and second grounding terminals 17 and 18 can be formed with high positional accuracy.

Figure 12:
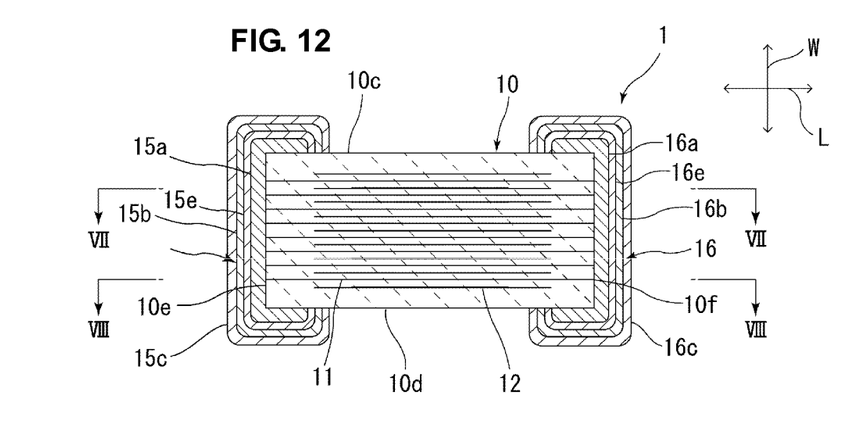
FIG. 12 is a schematic sectional view of a capacitor according to a second modification of a preferred embodiment of the present invention.

FIG. 12 is a schematic sectional view of a capacitor 10 according to a second modification of a preferred embodiment of the present invention. A fourth plating layer 15e and a fourth plating layer 16e may preferably be disposed between a calcined conductive layer 15a and a first plating layer 15b and between a calcined conductive layer 16a and a first plating layer 16b, respectively, as shown in FIG. 12. In this case, it is preferable that the fourth plating layers 15e and 16e and first plating layers 17a and 18a include Cu, the first plating layers 15b and 16b and second plating layers 17b and 18b include Ni, and second plating layers 15c and 16c and third plating layers 17c and 18c include Sn, for example. This enables the fourth plating layers 15e and 16e and the first plating layers 17a and 18a to be formed in the same plating step using Cu. That is, the fourth plating layers 15e and 16e and the first plating layers 17a and 18a can be formed such that after a conductive paste is applied to a first end surface 10e and second end surface 10f of the capacitor body 10, the capacitor body 10 is entirely plated with Cu. After the first plating layers 17a and 18a and the fourth plating layers 15e and 16e are formed together, the capacitor body 10 may be heat-treated to perform a baking step and an alloying step together. Alternatively, after the conductive paste is applied to the first and second end surfaces 10e and 10f of the capacitor body 10 and is then baked in a baking step, the first plating layers 17a and 18a and the fourth plating layers 15e and 16e may be formed together and then alloyed in an alloying step. When performing the baking step prior to the alloying step, co-firing may preferably be performed such that a step of calcining the capacitor body 10 and the baking step are performed together. After the fourth plating layers 15e and 16e and the first plating layers 17a and 18a are formed, the first plating layers 15b and 16b and the second plating layers 17b and 18b are preferably formed together in a plating step using Ni and the second plating layers 15c and 16c and the third plating layers 17c and 18c are then formed together in a plating step using Sn, for example. When the first plating layers 15b and 16b and the second plating layers 17b and 18b include Ni, the baking step and the alloying step may be performed subsequent to the formation of the first plating layers 15b and 16b and the second plating layers 17b and 18b.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A capacitor comprising:
    a capacitor body made of a dielectric, the capacitor body including a first principal surface and second principal surface extending in a length direction and a width direction, a first side surface and second side surface extending in the length direction and a height direction, and a first end surface and second end surface extending in the width direction and the height direction, and having a substantially cuboid shape;
    a first internal electrode disposed in the capacitor body;
    a second internal electrode disposed in the capacitor body and arranged to face the first internal electrode;
    a first signal terminal disposed on the first end surface and connected to the first internal electrode;
    a second signal terminal disposed on the second end surface and connected to the first internal electrode; and
    a grounding terminal disposed on a portion of the first side surface so as to be connected to the second internal electrode and connected to a ground potential; wherein the grounding terminal includes at least one plating layer disposed on the capacitor body and directly connected to the second internal electrode.

2. The capacitor according to claim 1, wherein the at least one plating layer is a wet plating layer.

3. The capacitor according to claim 1, wherein the capacitor is arranged to define a noise filter.

4. The capacitor according to claim 1, wherein the first and second signal terminals are connected to a positive potential.

5. The capacitor according to claim 1, wherein the grounding terminal does not include a calcined conductive layer.

6. The capacitor according to claim 1, wherein each of the first and second signal terminals includes at least one plating layer disposed on the outer surface of the capacitor body and directly connected to the first internal electrode, and each of the first and second terminals further includes at least one calcined conductive layer disposed on the at least one plating layer, the at least one calcined conductive layer including a glass component.

7. The capacitor according to claim 1, wherein each of the first and second signal terminals includes a calcined conductive layer disposed on the outer surface of the capacitor body and directly connected to the first internal electrode, the calcined conductive layer including a glass component, and each of the first and second signal terminals further includes at least one plating layer disposed on the calcined conductive layer.

8. The capacitor according to claim 6, wherein the calcined conductive layer includes Cu.

9. The capacitor according to claim 1, further comprising:
a dummy grounding electrode connected to the grounding terminal; wherein
the grounding terminal includes a portion disposed on the first principal surface and a portion disposed on the second principal surface;
the second internal electrode includes a facing portion arranged to face the first internal electrode in the height direction and a connecting portion connecting the facing portion to the grounding terminal; and
the dummy grounding electrode is disposed between the connecting portion of the second internal electrode and at least one of the portion of the grounding terminal disposed on the first and the portion of the grounding terminal disposed on the second principal surface in the height direction.

10. The capacitor according to claim 1, wherein the at least one plating layer connected to the second internal electrode includes a Cu plating sub-layer including Cu.

11. The capacitor according to claim 10, wherein the grounding terminal further includes a Ni plating layer disposed on the Cu plating sub-layer and including Ni, and a Sn plating layer disposed on the Ni plating layer and including Sn.

12. The capacitor according to claim 1, wherein the first and second internal electrodes are made of Ni.

* * * * *